F. W. KARCHES.
TIRE.
APPLICATION FILED JUNE 14, 1912.
1,051,117.
Patented Jan. 21, 1913.
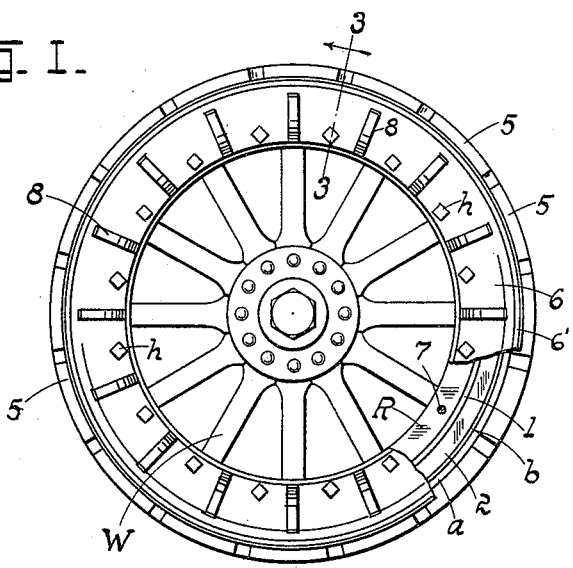
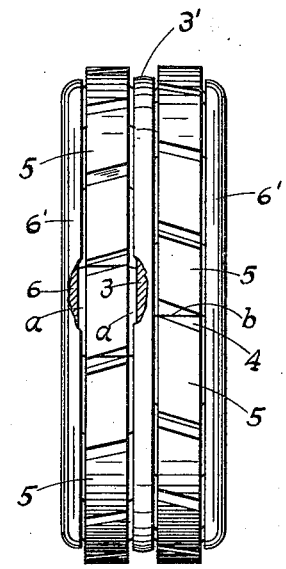
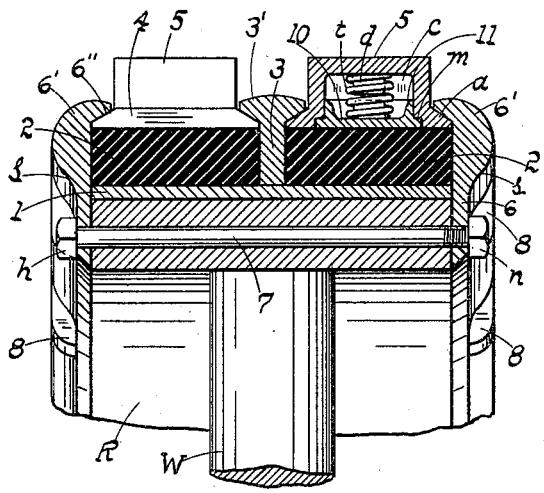
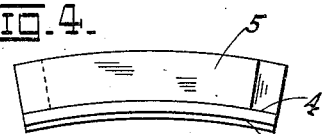
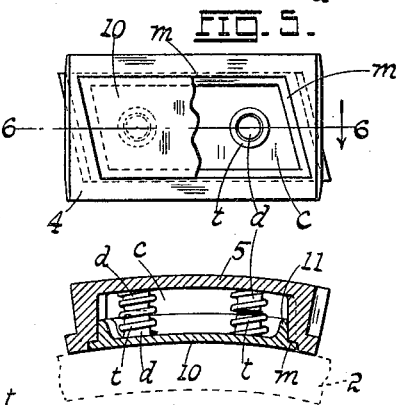
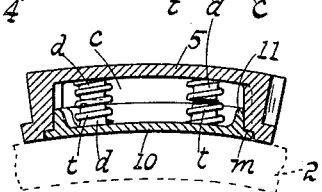
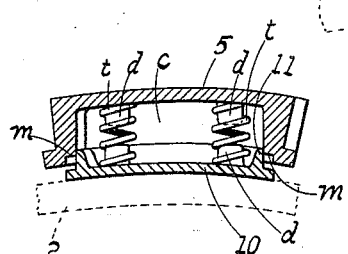
WITNESSES:
Harry A. Beimes.
INVENTOR.
Fred W. Karches.
BY
ATTORNEY.

UNITED STATES PATENT OFFICE.

FRED W. KARCHES, OF ST. LOUIS, MISSOURI, ASSIGNOR TO FIDEL GANAHL LUMBER COMPANY, OF ST. LOUIS, MISSOURI, A CORPORATION OF MISSOURI.

TIRE.

1,051,117.  Specification of Letters Patent.  Patented Jan. 21, 1913.

Application filed June 14, 1912. Serial No. 703,684.

*To all whom it may concern:*

Be it known that I, FRED W. KARCHES, a citizen of the United States, residing at St. Louis, State of Missouri, have invented certain new and useful Improvements in Tires, of which the following is a full, clear, and exact description, reference being had to the accompanying drawings, forming a part hereof.

My invention has relation to improvements in wheel-tires; and it consists in the novel construction of tire more fully set forth in the specification and pointed out in the claims.

In the drawings, Figure 1 is a face elevation of a wheel showing my invention applied thereto, with parts broken away; Fig. 2 is an edge view thereof; Fig. 3 is an enlarged cross-section on the line 3—3 of Fig. 1; Fig. 4 is a side view of one of the tread units or blocks detached; Fig. 5 is a bottom plan view of one of the tread units and follower plate therefor, a portion of the follower being removed; Fig. 6 is a longitudinal vertical section on the line 6—6 of Fig. 5, showing the tire before any material compression; and Fig. 7 is a similar section showing the tire compressed and the follower partially forced out of the tread-shoe in following up the compression of the tire.

The present invention has special application to wheels of heavy trucks, dray wagons, lumber wagons, and heavy delivery vehicles of any description whatsoever, though obviously not limited thereto.

The objects sought are to provide primarily a resilient tire coupled with durability and lasting qualities; one which shall insure a firm grip on the ground or surface over which the vehicle is propelled or drawn; one which is cheap to construct; one which may not slip or skid; one which shall be even running; and one possessing further and other advantages better apparent from a detailed description of the invention which is as follows:—

Referring to the drawing, W represents the body portion of a wheel, and R the outer rim or felly thereof, said rim being preferably oblong in cross-section, as shown (Fig. 3). Disposed about the rim R is a rigid band 1 which serves as the immediate supporting member for the inner pair of annular resilient rubber tire-sections or members 2, 2, the adjacent faces of said sections being separated a suitable distance by a spacing ring 3 slipped over the band 1. The member or section 2 is preferably a single piece of rubber, though obviously it may be composed of two or more pieces which when properly assembled will collectively envelop the felly or the reinforcing band 1 thereof. The expressions "tire-section," "annular unit," "resilient section," "resilient members," and "tire-members," used throughout the description and claims are therefore to be understood as contemplating a member composed either of one piece or of a number of parts or pieces properly assembled to envelop the wheel-felly. The ring 3 is provided with an outer flaring rim or double flange 3' the inner faces of which converge toward the faces of the web portion 3 of the ring (Fig. 3) for a purpose presently to appear. Disposed about each rubber section 2 are a series of units or thread-blocks 4 each provided with a chambered shoe or projection 5 in the shape of a parallelogram the transverse sides of which are inclined to the axis of the wheel and to the plane of rotation thereof, the ends of the shoes on one side dipping in one direction, while those on the opposite side dip in the opposite direction (Fig. 2). These shoes present proper cutting or gripping edges to the surface of the ground passed over, and reduce the danger or tendency of the wheel to skid or slide. The projections 5 extend only partially across the faces of the units 4 and are preferably cast or otherwise formed integrally therewith. The sides of the block 4 are beveled as shown at $a$, said beveled portions engaging the inclined inner faces of the rim 3' (Fig. 3), that is to say they are practically shouldered against the said rim 3'.

To retain the tire sections 2 and the band 1 on the rim R, and the blocks or units 4 on the sections 2, I provide the opposite faces of the wheel with retaining rings or annular guards 6 bearing against the sides of the rim and secured thereto by means of bolts 7 passed through the rim, the heads $h$ and nuts $n$ of the bolts being protected by the ribs 8 formed on the guards, which ribs form a shield should the vehicle collide with an object on the road. The parts $h$, $n$, are further protected by the shoulder $s$ at the base of the outer or marginal enlargement or rim 6' of the guard, which shoulder overhangs said parts *h*, *n*. The rim 6' is formed with an inwardly projecting flange having a bottom bevel face 6'' which engages the outer bevel formations *a* of the blocks 4, so that these blocks are virtually shouldered against the guards 6.

It will be seen from the foregoing that by driving home the nuts *n*, the guards 6, 6, from opposite sides of the wheel will be drawn together not only against the rim R, but against the sections 2, 2, and blocks 4. The latter will be forced against the spacing ring 3, the beveled engaging surfaces between the several parts (Fig. 3) permitting perfect freedom of movement between the parts, and in a measure compressing the rubber sections sufficiently to take up any loose play between the parts. It will be apparent that the inclined surfaces between the parts 3', 6'', and *a* will cause the blocks 4 to be drawn firmly against the rubber 2, and hence force or squeeze the latter firmly against the parts 3, 6, 4, and thereby form a tread of maximum lasting qualities, and yet sufficiently elastic for practical purposes. The tread proper being composed of independent sections or units 4, allows free play between the units (the joints *b* between which are disposed in radial planes passing through the axis of the wheel), each unit yielding radially and independently under the load imposed on the wheel, and compressing the rubber 2 in such yielding movement. Obviously the block at the bottom of the wheel will be subjected to the greatest displacement under a load, such block being forced outwardly to its normal position by the resilient member 2 as soon as the block leaves the ground with the wheel's rotation.

With a constant use of the wheel, the rubber section 2 will, in a measure lose their resiliency, and in time become compressed more or less, thereby causing an undesirable looseness between the parts 4, and 3', 6'', and an excessive play of the blocks 4 along the adjacent faces of the members 3 and 6. To permanently maintain the surfaces *a*, in contact with the faces 6'' and with the inclined faces of the flange 3', I make the shoes or projections 5 hollow, each shoe being provided with a chamber *c* opening toward the tire 2, the open end of the chamber being closed by a plate or follower 10 bearing against the tire, the outer wall of the chamber *c* and the opposite face of the plate 10 being provided with studs *d*, *d*, encircled by a compression spring *t*, the tendency of which is to drive the members 5 and 10 apart. The plate 10 is provided with a guide flange 11 engaging the inner walls of the chamber *c*, and with a new tire, the portions of the plate outside the flange 11 are shouldered against the tread member, the shoulder or ledge *m* arresting the movement of the plate 10 outwardly (that is to say, outwardly from the axis of the wheel, or inwardly into the chamber of the shoe). Were it not for the arrangement just described, it is obvious that in time, and after the tire section 2 became considerably compressed and had lost their elasticity, the tread units 4 would become loose and there would thus be too much play between the parts *a*, 3' and 6'' and a very unsatisfactory wheel would be the result. With my improvement however, as the tire 2 compresses, the springs *t*, *t*, expand, driving the plate or follower firmly against the tire and driving the tread units outwardly so that they remain in permanent contact with the members 3' and faces 6'' of the members 6 (except of course, at such times as the tread-units successively pass over the ground when the springs *t* allow them to yield inwardly). To the extent therefore that the members 2 may lose their resiliency, the springs *t* will contribute to it, and a permanently elastic tread is the result, the units 4 being at all times forced radially to their outermost limits by said springs, which thus reduce to a minimum the radial play of said units. An excessive radial movement of the units 4 due to an abnormal compression of the tire 2 would not only result in a badly running wheel, but a wheel which would disintegrate in a very short period of time. The presence of the springs maintains this play as a constant quantity thus insuring a uniform character of service for the wheel, and prolonging the life of the tire. With a fresh tire the face of the follower plate 10 engaging the tire is flush with the corresponding face of the block 4, the block receding from the tire with any undue compression of the latter (Fig. 7), under the expanding action of the more powerful springs *t*.

Having described my invention, what I claim is:—

1. In combination with a wheel provided with a rim, a tire comprising an inner resilient section encompassing the rim, an outer tread composed of a series of independent units enveloping the resilient section, and resilient devices relatively stiffer than the resilient section interposed between the inner tire-section and the respective units for maintaining the latter at a permanent radial distance from the rotation axis of the wheel.

2. In combination with a wheel provided with a rim, a tire comprising an inner resilient section encompassing the rim, an outer tread composed of a series of independent chambered units enveloping the inner section, means on the sides of the rim for holding the tire against lateral displacement, and springs relatively stiffer than the resilient section in the chambers of the units for maintaining the latter a permanent radial distance from the axis of rotation of the wheel.

3. In combination with a wheel provided with a rim, a tire comprising a band encompassing the rim, a pair of resilient members enveloping the band, a spacing ring for holding said members apart, a series of chambered tread blocks having free play among themselves distributed about the resilient members, means on the sides of the rim for holding said blocks to the resilient members and preventing lateral displacement of the members, follower plates in the chambers of the blocks engaging the resilient members, and springs interposed between the plates and outer walls of the chambers of the blocks for maintaining the latter a permanent radial distance from the axis of rotation of the wheel.

4. In combination with a wheel provided with a rim, a tire comprising a band encompassing the rim, a pair of resilient tire members enveloping the band, a spacing ring disposed about the band and having an inner web engaging the inner sides of the tire members, and provided with an outer rim having inner inclined faces converging toward the web, a series of chambered tread units having free play among themselves disposed about each tire member and having beveled sides engaging the inclined faces of the rim of the spacing ring, retaining rings carried by the sides of the rim and provided with flanges having inclined faces, the sides of the tread units being beveled to engage said faces, flanged follower plates normally shouldered to the walls of the chambers of the tread units and engaging the tire members, and compression springs in the chambers of the units between the follower plates and outer walls of the chambers for forcing the tread units into permanent engagement with the bevel faces of the rim of the spacing ring and with the bevel faces of the retaining rings.

5. In combination with a wheel provided with a rim, a tire comprising an inner resilient section encompassing the rim, an outer tread composed of a series of independent units enveloping the resilient section, resilient devices relatively stiffer than the resilient section interposed between said section and the respective units for driving the latter outwardly, and means on the rim for limiting the outward movement of said units and retaining them at permanent radial distances from the rotation axis of the wheel.

6. In combination with a wheel having a rim, a rubber tire-section encompassing the same, a series of independent radially moving tread units encompassing the tire section and separated from one another along radial planes passing through the rotation axis of the wheel, and resilient devices of relatively greater stiffness than the tire section interposed between the tread units and the tire-section for maintaining said units a permanent radial distance from the rotation axis of the wheel, with any permanent compression of the tire-section.

7. In combination with a wheel provided with a rim, a tire comprising an inner resilient section encompassing the rim, an outer tread composed of a series of independent units enveloping the resilient section, resilient devices relatively stiffer than the resilient section interposed between said section and the respective units for driving the latter outwardly, and means on the wheel for limiting the outward movement of said units and retaining them at permanent and substantially uniform radial distances from the rotation axis of the wheel.

8. In combination with a wheel having a rim, a tire comprising an inner resilient annular unit encompassing the rim, a series of tread units collectively encompassing the resilient unit, and springs relatively stiffer than the annular unit interposed between the tread units and the resilient unit for maintaining the tread units a permanent radial distance from the rotation axis of the wheel with any compression of the annular unit.

9. In a wheel, a tread unit comprising a member having a chamber opening toward the rim of the wheel, a follower guided radially by the walls of the chamber and interposed between the wheel rim and the roof of the chamber, and springs confined between said roof and the follower for forcing the tread unit outwardly.

In testimony whereof I affix my signature, in presence of two witnesses.

FRED W. KARCHES.

Witnesses:
 EMIL STAREK,
 JOS. A. MICHEL.

---

Copies of this patent may be obtained for five cents each, by addressing the "Commissioner of Patents, Washington, D. C."